(No Model.)

W. F. NILES.
Treating Hoof for the Manufacture of Buttons, &c.

No. 237,309. Patented Feb. 1, 1881.

Witnesses
Otto Hufeland
William Miller

Inventor
William F. Niles
by Van Santvoord & Hauff
his attys

N. PETERS, PHOTO-LITHOGRAPHER, WASHINGTON, D. C.

UNITED STATES PATENT OFFICE.

WILLIAM F. NILES, OF JERSEY CITY, N. J., ASSIGNOR TO WILFORD L. PALMER, OF NEW YORK, N. Y.

TREATING HOOF FOR THE MANUFACTURE OF BUTTONS, &c.

SPECIFICATION forming part of Letters Patent No. 237,309, dated February 1, 1881.

Application filed December 31, 1880. (No model.)

*To all whom it may concern:*

Be it known that I, WILLIAM F. NILES, a citizen of the United States, residing at Jersey City, in the county of Hudson and State of New Jersey, have invented new and useful Improvements in Treating Hoof for the Manufacture of Buttons and other Articles, of which the following is a specification.

This invention relates to a new process for washing hoof after the same has been reduced to a fine powder, so that it is freed from all soluble impurities mixed with or adhering to it before the coloring-matter is added and the mass is introduced into the molds which impart to the same the required shape.

Heretofore raw horn or hoof has been treated in the following manner: After having been washed the horn or hoof is divided into pieces of convenient size, and then ground to a fine dust or powder upon an emery-wheel, grindstone, or other pulverizing or grinding machine. The dust or powder thus obtained is mixed with a large quantity of water and passed through one or more depositing-tanks to free it from mineral dirt or grit, which latter, being heavier than the horn-powder, quickly settles to the bottom of the tanks. After the dirt or grit has been separated from the dust a coloring-dye is added to the latter while it remains mixed with the water, which insures an equal distribution of the dye to all the particles of the dust, so that a uniform color or tint is produced. The dust or powder is next separated from the water, which can be done by allowing it to remain quiet in the tanks until the dust settles to the bottom, and then drawing off the water, or by drawing the mixture into cloth bags and forcing out the water by means of suitably-applied pressure. This process is described in Letters Patent granted to myself and S. G. Pitts, June 20, 1871, No. 116,213; and though it may work very well with horn when hoof is treated as above stated, the soluble impurities contained therein are not removed, since the same, even after having been dissolved by the water, remain mixed with the dust and the coloring-matter, and settle down with them when the water is drawn off. This difficulty is obviated by my present invention.

Figure 1:
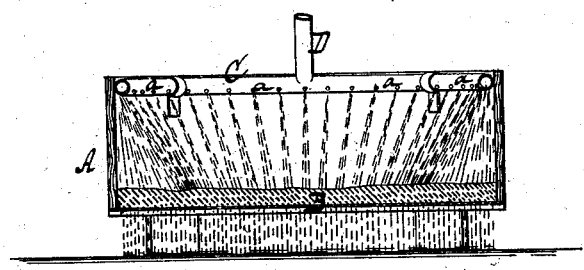
Figure 2:
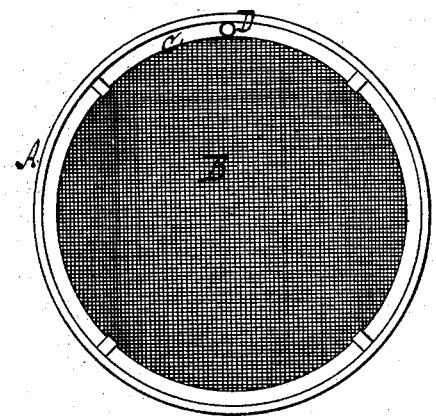

The apparatus which may be used in carrying out my invention is illustrated in the accompanying drawings, in which Figure 1 represents a vertical central section. Fig. 2 is a plan or top view.

Similar letters indicate corresponding parts.

In carrying out my invention I wash the hoof in clear water. Then I reduce it to a fine powder by a suitable grinding apparatus, and this powder I spread on the bottom of a tank or vat, said bottom forming a fine sieve. I then expose the layer of hoof-powder to a continuous shower of clean water, which extends as uniformly as possible over the entire surface of the layer, so that the water comes in contact with all the particles of hoof and carries off with it such impurities which are soluble in water; for if the impurities are once dissolved they pass through the meshes of the sieve, together with the water, while the undissolved powder is retained by the sieve. After the layer of hoof-powder has been exposed to the action of the shower of water for a sufficient length of time, which must be ascertained by experience, the water is shut off and a quantity of coloring-matter is dissolved and poured over the mass in the sieve, which is kneaded or otherwise manipulated so as to mix the coloring-matter uniformly with the hoof-powder. After this has been accomplished the mass may be dried by any suitable means, when it is ready to be introduced into suitable molds.

In the drawings, the letter A designates a tub or vat, the bottom of which forms a fine sieve. On the inside of said tub or vat, and near its top edge, is secured a pipe, C, which extends all round, and is provided on its inner side with a number of small holes, *a*. The pipe C connects with a water-supply pipe, D, and, if water under pressure is admitted through this supply-pipe, a number of fine jets are thrown out of the holes $a$, and the water is uniformly distributed over the layer of hoof-powder, which is spread on the sieve B.

What I claim as new, and desire to secure by Letters Patent, is—

The within-described process for treating hoof by first reducing the hoof to a powder, then spreading this powder on a sieve and exposing it to a continuous shower of clear water, which extends as uniformly as possible over the layer formed by the powder on the sieve, substantially as and for the purpose set forth.

In testimony whereof I have hereunto set my hand and seal in the presence of two subscribing witnesses.

WM. F. NILES. [L. S.]

Witnesses:
J. HERMANN WAHLERS,
E. F. KASTENHUBER.